April 21, 1931.    J. F. SAYE    1,801,983

METHOD AND APPARATUS FOR SEALING WELL CASINGS

Filed Aug. 21, 1929

INVENTOR
JOHN F. SAYE

BY
ATTORNEYS

Patented Apr. 21, 1931

1,801,983

UNITED STATES PATENT OFFICE

JOHN F. SAYE, OF BELL, CALIFORNIA

METHOD AND APPARATUS FOR SEALING WELL CASINGS

Application filed August 21, 1929. Serial No. 387,376.

This invention relates to an improvement in a method and an apparatus for sealing well casings.

An object of the invention is to provide an improved method of sealing a well casing, or forming a seal thereabout, to prevent water in strata penetrated or passed through from entering the well casing. The improved method contemplates the use of a composition which will stiffen or harden under the action of heat, such as a composition containing rubber. By the improved method a rubber seal is formed about the well casing, between the well casing and the walls of the well, which is cured or vulcanized in place. In deep wells, such as wells which are about 7000 feet deep, normal temperature near the bottom of the well reaches about 200° F. I am aware that there are prior methods which form a seal between the well casing and the walls of the well employing a composition which can be melted while in the well and allowed to harden therein. In such methods, however, the hardening or stiffening of the composition takes place during the cooling and such methods are practical only in shallow wells wherein the temperature at the bottom of the well is relatively low. By the improved method, wherein a rubber seal is cured or vulcanized in place, the rubber composition hardens or stiffens under the action of heat and will remain in this condition after it cools to the normal temperature of the well. Also the character of the seal is such that it will not be softened by the high temperatures present at the bottom of the well.

Another object of the invention is to provide an apparatus for positioning a rubber compound about a well casing so that it may be vulcanized in place thereabout to form a rubber seal. The rubber seal thus established is highly advantageous over cement seals in that it has some resiliency. Vibrations of the casing will not crack or break the seal as is true where cement is employed.

With the foregoing and other objects in view, which will be made manifest in the following detailed description, and specifically pointed out in the appended claims, reference is had to the accompanying drawings for an illustrative embodiment of the invention, wherein:

Figures 1, 2, 3:
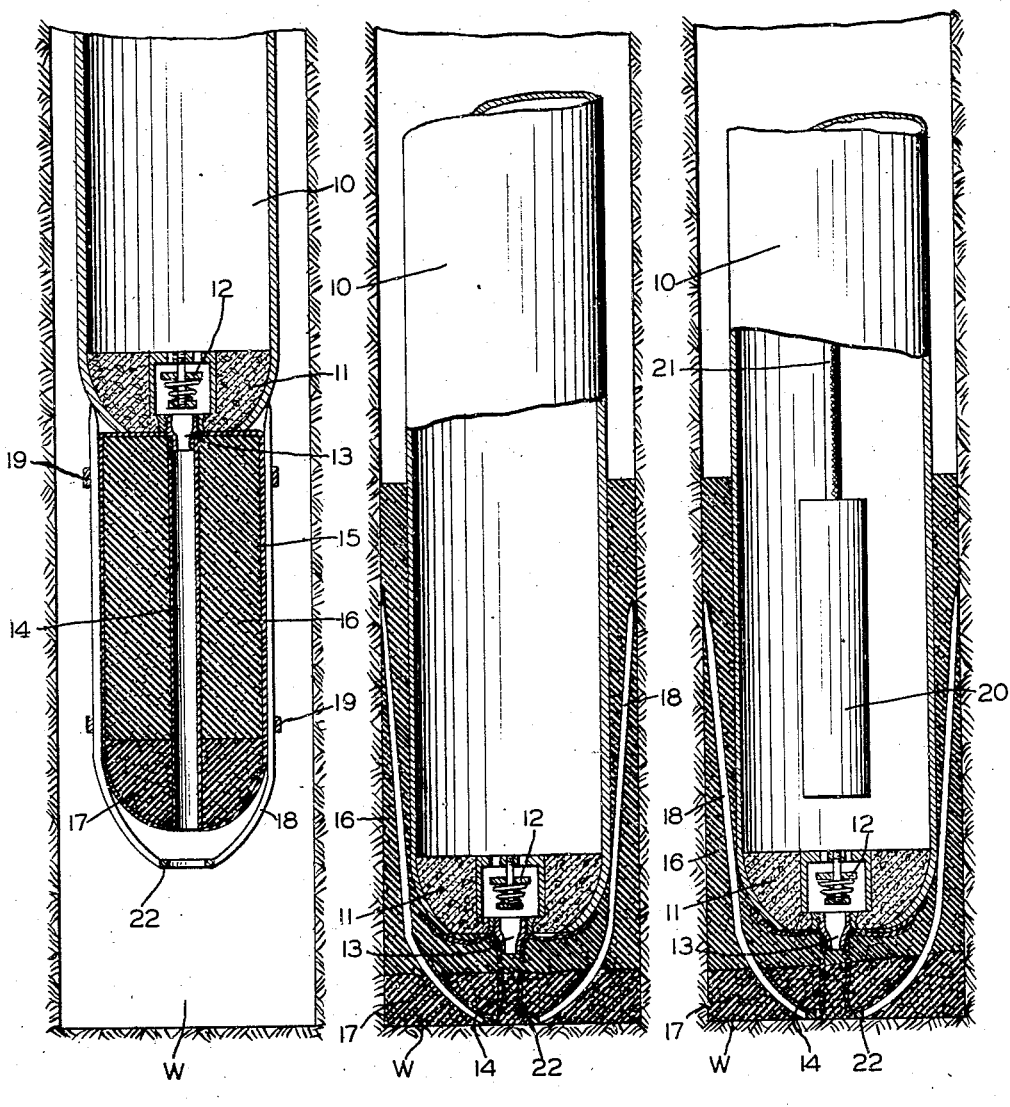
Fig. 1 is a vertical section through the lower portion of a well and through the bottom of a casing therein, illustrating the apparatus in the position just prior to landing the casing.
Fig. 2 is a view similar to Fig. 1, illustrating the position of parts after the casing has been landed.
Fig. 3 is a view similar to Fig. 1, illustrating the compound after being stiffened or hardened under the application of heat.

Referring to the accompanying drawings, wherein similar reference characters designate similar parts throughout, the reference character 10 indicates a casing within a well hole W, having a cement casing plug 11 in its bottom. In the casing plug there is provided a float valve 12. A suitable nipple 13 extends downwardly from the float valve and a tubular member 14 is secured thereto. This tubular member may be rubber hose or cast iron pipe, the intention being to employ a suitable material which can be readily broken up or drilled through during further drilling operations. A cured rubber envelope 15 has its top edges secured to the top of the hose or tubular member 14 and has its bottom edges secured to the bottom thereof. This rubber envelope may be strengthened by fabric or, if desired, fabric may be substituted for the rubber in its construction. Within the chamber, thus defined by the tubular member 14 and the envelope 15, there is a compound 16 which is adapted to stiffen or harden under the application of heat. The compound 10 preferably employed contains rubber and a curing agent. I find that gasket stock is suitable for my purposes. In some instances there are two different kinds of compound present within the envelope, the lower portion of the envelope containing a compound 17 of slightly different nature from that which is in the upper part of the envelope. When both compounds are employed, the upper compound is adapted to cure or be vulcanized into soft live resilient rubber and the lower compound is designed to cure or to be vulcanized into hard rubber.

A plurality of rods 18 are preferably secured to the outer sides of the envelope, as by suitable straps or equivalent fastening elements 19. The rods 18 serve to stiffen the envelope so that it may be caused to penetrate the heavy thick mud which collects in the bottom of the well when drilling operations are stopped, and thus enable the envelope to reach the very bottom of the well W before it is ruptured. The lower ends of the rods 18 may be curved inwardly and joined to a ring or spider 22.

The casing 10 is lowered into the well with the apparatus, as above described, attached thereto and during the lowering circulation fluid, which is relatively cool, is kept flowing downwardly through the casing. This circulation fluid passes downwardly through float valve 12 and through the tubular member 14 and by virtue of its being relatively cool it will keep the compounds 16 and 17 cool so that they will not cure under the action of the heat naturally present in the well. On reaching the bottom of the well the envelope can be forced through the heavy mud which collects therein by virtue of the stiffening rods 18 and on further lowering the casing the envelope 15 will be ruptured, as shown in Fig. 2, squeezing out the compounds 16 and 17 and causing them to flow upwardly about the bottom of the casing. The stiffening rods 18 merely pass upwardly about the casing and are disposed within the compounds.

When in this condition a heater 20, which may be an electric water heater, is lowered into the casing by the cable 21 which supplies electric current thereto. This heater serves to radiate heat through the walls of the casing 10 and will heat the compound surrounding the casing sufficiently to cure it. Preferably the nature of the compound is such that it will cure at about 100° above the normal temperature at the bottom of the well. The time required to cure the rubber can be determined in advance and in this way the driller at the surface can ascertain as to how long the heater should be left in place to completely cure the compound. By then withdrawing the heater the well is in condition for further drilling operations and no delay is required, as in the case of cement which must be allowed to set. It will be appreciated that although the temperature at the bottom of the well may be as high as 200° F. at 7000 feet and higher at greater depths, that this temperature will not soften or affect the rubber seal. The rubber seal being vulcanized or cured in place will adequately seal off the casing against the entrance of water from above the seal.

Another advantage which is relatively important resides in the fact that the rubber forms a good bond with the exterior surface of the casing and is somewhat resilient so that any vibrations of the casing will not crack or break the seal but will merely stretch the rubber slightly.

In the event that the seal is misplaced, it is possible to strip the casing out of the rubber and thus recover the casing, which is not possible in the case of cement seals.

From the above described apparatus and method it will be appreciated that a highly advantageous seal can be formed in an oil well, or other well, which will effectively prevent water or other undesirable fluids from entering the casing.

Various changes may be made in the details of construction without departing from the spirit or scope of the invention as defined by the appended claims.

I claim:
1. The method of sealing well casings which comprises positioning a material in the well about the casing which stiffens or hardens upon the application of heat.
2. The method of sealing well casings which comprises positioning a material in the well about the casing which stiffens or hardens upon the application of heat, and heating the material through the casing.
3. The method of sealing well casings which comprises positioning a compound containing uncured or partially cured rubber in the well about the casing, and curing it in place.
4. The method of sealing well casings which comprises positioning a compound containing uncured or partially cured rubber in the well about the casing, and curing it in place by applying heat through the walls of the casing.
5. An apparatus for sealing well casings comprising a rupturable envelope adapted to be lowered by a well casing into a well, and a composition adapted to stiffen or harden on heating disposed therein.
6. An apparatus for sealing well casings comprising a rupturable envelope adapted to be lowered by a well casing into a well, a composition adapted to stiffen or harden on heating disposed therein, and means for stiffening the envelope so that it may be caused to penetrate the thick mud which collects at the bottom of the hole when drilling operations are discontinued.
7. An apparatus for sealing well casings comprising a rupturable envelope adapted to be lowered by a well casing into a well, a composition adapted to stiffen or harden on heating disposed therein, and means enabling circulation fluid to be discharged through the envelope to keep the composition cool while being lowered into the well.
8. The method of sealing oil well casings which comprises positioning uncured rubber compound about the casing and vulcanizing it in place by the application of heat.

9. The method of sealing oil well casings which comprises positioning a compound containing uncured rubber about the casing and vulcanizing it in place.

In testimony whereof I have signed my name to this specification.

JOHN F. SAYE.